United States Patent [19]

Wilkinson

[11] 4,296,451
[45] Oct. 20, 1981

[54] ULTRA HIGH SPEED PROTECTIVE RELAY CIRCUIT

[75] Inventor: Stanley B. Wilkinson, Havertown, Pa.

[73] Assignee: General Electric Company, Philadelphia, Pa.

[21] Appl. No.: 108,436

[22] Filed: Dec. 31, 1979

[30] Foreign Application Priority Data

Oct. 11, 1979 [GB] United Kingdom ............... 35313/79

[51] Int. Cl.³ .............................................. H02H 3/28
[52] U.S. Cl. .......................................... 361/80; 361/83
[58] Field of Search ....................... 361/79, 80, 82, 83, 361/85, 86, 87

[56] References Cited

U.S. PATENT DOCUMENTS

| 3,374,399 | 3/1968 | Dewey . | |
|---|---|---|---|
| 3,992,651 | 11/1976 | Hodges . | |
| 4,034,269 | 7/1977 | Wilkinson . | |
| 4,092,690 | 5/1978 | Wilkinson | 361/80 |
| 4,161,011 | 7/1979 | Wilkinson | 361/80 |

FOREIGN PATENT DOCUMENTS

52-48033 4/1977 Japan .................... 361/80

Primary Examiner—Harry E. Moose, Jr.
Attorney, Agent, or Firm—William Freedman; John P. McMahon

[57] ABSTRACT

A protective relay circuit includes a first a-c level detector or bi-polar threshold circuit to which a polarizing signal $V_{POL}$ is applied. An output is provided from the first a-c level detector only when the magnitude of $V_{POL}$ exceeds a predetermined value. Also included is a second a-c level detector or bi-polar threshold circuit to which an operating signal $V_{OP}$ is applied. An output is provided from the second a-c level detector only when the magnitude of $V_{OP}$ exceeds a predetermined value. The output of the first level detector is compared in a coincidence circuit with the output of the second level detector. The detection of coincidence for a predetermined time period, as measured by a characteristic timer, results in an output signal for use in controlling operation of a trip coil of a circuit breaker.

18 Claims, 10 Drawing Figures

ULTRA HIGH SPEED PROTECTIVE RELAY CIRCUIT

BACKGROUND OF THE INVENTION

The present invention relates to protective relay circuits for use in a-c power systems and more particularly to ultra high speed circuits for transmission line protection.

Distance relays are well known in the art of protective relaying. For example, reference may be had to to "The Art and Science of Protective Relaying", Mason, published by John Wiley & Son, Inc. (1956), particularly to Chapter 14. Prior art distance relays include those which employ a phase comparator method of measurement. Exemplary circuits for phase comparator distance relays are disclosed in U.S. Pat. No. 4,034,269, entitled "Protective Relay Circuits", issued July 5, 1977 to S. B. Wilkinson. This patent is assigned to the assignee of the present invention and is hereby incorporated by reference into the present application.

In the phase comparator method of measurement, the relay operates by measuring the angle between two or more phasors derived within the relay. Briefly, this is accomplished by the use of an a-c coincidence circuit in combination with a timer circuit. For example, in the case of the phase distance relay of FIGS. 6 and 7 of my previously referenced U.S. Pat. No. 4,034,269, a coincidence detector 286 develops an output signal when phase coincidence exists between a polarizing signal ($V_{AB}$) and an operating signal $[(I_A - I_B)Z_R - V_{AB}]$. A characteristic timer 288 then measures the duration of the phase coincidence and operates when phase coincidence occurs for a predetermined minimum time equal to the relay operate time. It is to be appreciated that, for faults within the intended reach of the relay, the phase coincidence is greater than $\frac{1}{4}$ cycle or 90°. Thus, for 60 cycle protective relaying applications, where $\frac{1}{4}$ cycle equals 4.167 ms, the timer is ordinarily set at 4.167 ms.

A traditional problem with distance relays is the compromise between operating time and the need to prevent operation on heavy load flow or load swings. For example, on long lines, 120° characteristic timer settings are often used to preclude operation on load swings that would enter the standard circular characteristic when using a 90° timer setting. This 120° characteristic timer setting establishes a minimum operating time of 5.5 ms for all fault incidence angles.

Another problem with conventional prior art distance relays involves the undesired tripping for faults which occur very close to the relay on the bus behind it. Because of the load flow over the line in a situation such as this, the operate signal $V_{OP}$ leads the initial polarizing voltage $V_{POL}$ by substantially more than 180°, causing the angle between $V_{OP}$ and the steady state $V_{POL}$ to be much less than 90°. This condition could cause the operation of a conventional, prior art distance relay. A further problem with conventional prior art distance relays concerns their inability to immediately clear high level faults due to their slower operating speeds.

In some prior art distance relay designs, a forward offset is employed to minimize the probability of relay operation under load conditions. This forward offset could be employed both to minimize the angular separation of the operate and polarizing signals, and to preclude operation of the distance relay when the impedance "seen" by the relay due to an out of step condition, passes through the line impedance. For this application, the offset impedance should be precisely equal to the line impedance. If it is less, the relay will operate for power swings passing through the line impedance near the end of the line; and if it is larger, there is a danger that the polarizing voltage will reverse during the fault on the remote bus and cause a false operation when the fault is cleared and the operate voltage returns to its phase position, which would be approximately in phase with two reverse polarizing voltage.

It is therefore, one object of the present invention to increase the overall power system reliability by providing a protective relay circuit which causes the fast clearing of severe faults.

Another object of the present invention is the provision of the protective relaying circuit which enhances the security of the transmission line protective system by preventing tripping upon occurrence of faults which occur close to, but behind the relay.

Still another object of the present invention is the provision of a protective relay circuit which eliminates the possibility of undesired operation on clearing external faults, or power swings passing through the line impedance, and particularly for those difficult ones near the end of the line.

SUMMARY OF THE INVENTION

The present invention comprises a protective relay circuit for generating a signal for controlling the trip coil of a circuit breaker protecting an alternating current power transmission line. The circuit comprises difference circuit means for producing a first difference signal which is proportional to the difference between a signal proportional to the transmission line current multiplied by a preselected constant reference impedance, and a signal proportional to transmission line voltage. A first alternating current level detector, responsive to the first difference signal, is provided for producing an output signal when the first difference signal exceeds a predetermined threshold value.

The protective relay circuit of the present invention also comprises difference circuit means for producing a second difference signal which is proportional to the difference between a signal proportional to a voltage representative of the transmission line voltage, and a signal which is proportional to the product of a signal proportional to the transmission line current and the preselected constant reference impedance multiplied by a predetermined constant. Filter means, responsive to the second difference signal, is provided for filtering transients from the second difference signal and for providing memory of the prior steady state second difference signal.

A second alternating current level detector, which is responsive to the filtered second difference signal, is provided for producing an output signal when the filtered signal exceeds a predetermined threshold value. Coincidence detector means is provided for producing a coincidence signal output in response to detecting coincidence between the output signal of the first alternating current level detector and the output signal of the second alternating current level detector. Coincidence responsive means is provided for receiving the coincidence signal output and being operative, when enabled, to effect operation of the trip coil in response to a coincidence signal output of a predetermined minimum duration. The protective relay circuit permits production of a effective coincidence signal output only if the first difference signal and the filtered second difference signal both exceed respective predetermined threshold values.

DETAILED DESCRIPTION OF THE DRAWINGS

While the specification concludes with claims particularly pointing out and distinctly claiming that which is regarded as the present invention, the object and advantages of this invention can be more readily ascertained from the following description of a preferred embodiment when read in conjunction with the accompanying drawings in which:

DETAILED DESCRIPTION

For the sake of convenience, certain elements described with reference to a specific figure will retain the same reference designation in the description of subsequent figures.

Figure 1:
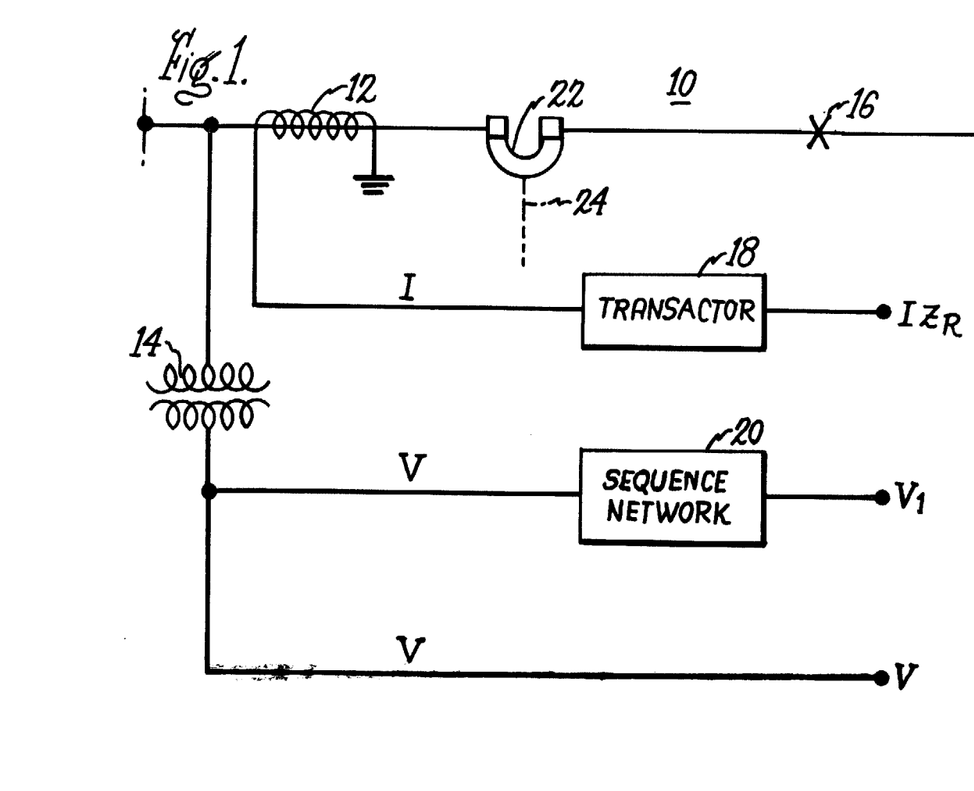
FIG. 1 is a schematic diagram of an uncompensated a-c power transmission line showing protective relay sensors connected therewith as well as a block diagram of associated signal processing means for developing signals for use by the protective relay circuit of the present invention.

Referring to FIG. 1, there is shown an alternating current power transmission line, generally designated 10, having a means 12 for sensing the current in the line and a means 14 for sensing the voltage on the line. As is well known to those skilled in the protective relaying art, current sensing means 12 may be a current transformer and voltage sensing means 14 may be a step down potential transformer. However, it is understood that other suitable sensing means may be used. The current transformer 12 develops an output current I proportional to the line current, and the potential transformer 14 develops an output voltage V proportional to the line voltage. A fault X is shown located at 16 along the transmission line 10. During a fault condition, the line voltage is equal to the line current multiplied by the impedance of the line from the fault 16 to current sensing means 12 and voltage sensing means 14. The following description entails the use of the secondary quantities I and V which, as stated above, are proportional to the primary current and voltages of the transmission line. The impedance of the total length of the transmission line 10 is designated $Z_L$. It is assumed for the purposes of discussion here that current sensing means 12 and voltage sensing means 14 are located at substantially the same position on the transmission line 10. It is understood that the transmission line diagram in the figure is not drawn to scale.

The output of the current sensing means 12 is applied to a transactor 18. The output of the transactor 18 is proportional to the current I times a preselected constant impedance $Z_R$, commonly referred to as a replica or reference impedance. As is known in the art, $Z_R$, determines the reach of a distance relay. Such transactor devices are well known in the art. The secondary voltage output of the transactor is related to the current I by a complex proportionality constant or vector operator known as the transfer impedance Z of the transactor. The output voltage of the transactor 22 is therefore equal to $IZ_R$ where the transfer impedance of the transactor is selected to be equal to $Z_R$. Further detailed discussion of a transactor may be had by reference to U.S. Pat. No. 3,374,399, issued to Dewey, which is assigned to the assignee herein, and the teachings of which are incorporated by reference as is fully set forth herein.

The voltage sensing means 14 applies a signal V which is proportional to the voltage on the transmission line to a voltage sequence network 20. It is well understood by those skilled in the art of electric power transmission and distribution that the phase voltages in a three phase alternating current electric circuit can be resolved into three sets of symmetrical, balanced voltage vectors known respectively as positive sequence, negative sequence and zero sequence components. It is also well known that certain circuits called "symmetrical component networks" can be connected to a three phase electric power system to provide an output signal that is proportional to the magnitude of a selected one of the three sequence components of voltage. The sequence network 20 is one such network, the output V, of which is selected to be proportional to the positive sequence component of the line voltage. One such sequence network is disclosed in U.S. Patent Application Ser. No. 41,137 of M. E. Hodges, filed May 21, 1979. Further detailed discussions of symmetrical component networks may be had by reference to U.S. Pat. Nos. 3,992,651, issued to Hodges and 4,034,269 issued to Wilkinson, both U.S. Patent Application Ser. No. 41,137, all of which are assigned to the assignee herein and the teachings of all of which are incorporated by reference as if fully set forth herein. Also shown schematically in FIG. 1 is a circuit breaker 22 having a control input which is represented by dotted line 24.

Figure 2:
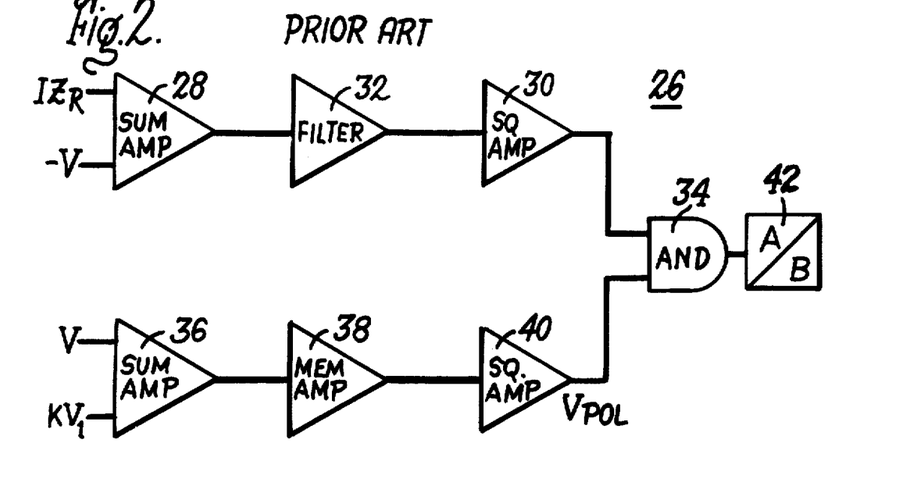
FIG. 2 is a block diagram of a prior art distance relay.

Referring now to FIG. 2, there is shown a block diagram of a prior art distance relay generally designated 26. The prior art distance relay 26 comprises a first summing amplifier 28. The first summing amplifier 28 receives an input $IZ_R$, from the transactor 18 as well as an input, $-V$, from the voltage sensing means 14 through an inverting amplifier (not shown). Consequently, the output of the first summing amplifier 28 comprises a signal which is representative of the quantity $(IZ_R - V)$. The output of the first summing amplifier 28 is connected to the input of a first squaring amplifier 30 through a filter 32. The filter 32 attenuates any transients which may be on the signal output from the first summing amplifier 28 while the first squaring amplifier 30 shapes the signal into a form usable as an input to AND gate 34. The output of the first squaring amplifier 30, which is connected to one input of the AND Gate 34, is hereinafter referred to as the operating voltage $V_{OP}$.

The prior art distance relay 26 also includes a second summing amplifier 36. A signal V from the voltage sensing means 14 which, as previously described, is representative of the line voltage, is connected to one input of the second summing amplifier 36. The output of the sequence network 20 is connected to a second input of the second summing amplifier 36 through an attenuator (not shown). The signal connected to the second input of the second summing amplifier 36 is a quantity $V$, representative of the positive sequence component of the transmission line voltage multiplied by a predetermined constant K, as further discussed in my copending U.S. Patent Application Ser. No. 032,303, filed Apr. 23, 1979. The output of the second summing amplifier 36 is representative of the quantity $(V + KV_1)$ and is connected to the input of a memory filter 38. The memory filter 38 attenuates any transients which may be on the output signal from the second summing amplifier 36. In addition, the Q of the memory filter 38 is such that a change in the output signal from memory filter 38 lags a corresponding change in the input thereby providing a short term memory of the pre-change $(V + KV_1)$ signal. The output of the memory filter 38 is connected to the input of a second squaring amplifier 40. The second squaring amplifier 40 shapes the signal into a format acceptable by the AND gate 34. The output of the second squaring amplifier 40 is representative of the signal $(V + KV_1)$ which is hereinafter referred to as the polarizing voltage, $V_{POL}$. The output of the AND gate 34 is coupled to a characteristic timer 42. The characteristic timer 42 measures the duration of the phase coincidence of $V_{POL}$ and $V_{OP}$ and operates when this phase coincidence occurs for a predetermined minimum time which is equal to the relay operate time. Further information on AND circuitry and coincidence timer circuitry can be found in my copending U.S. Patent Application Ser. No. 879,653, filed Feb. 21, 1978, and issued as U.S. Pat. No. 4,161,011 the teachings of which are incorporated by reference as if fully set forth herein.

Figure 3:
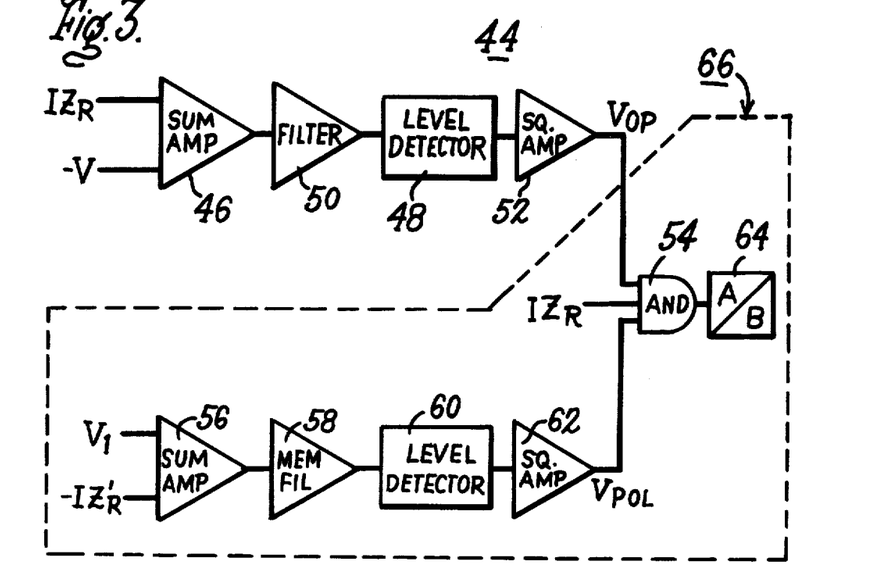
FIG. 3 is a block diagram of a protective relay in accordance with the present invention.

Referring now to FIG. 3, there is shown a block diagram of an ultra high speed protective relay in accordance with the present invention, generally designated 44. The relay 44 includes a first summing amplifier 46. The output of the transactor 18, which is representative of the quantity $IZ_R$, is coupled to one input of the first summing amplifier 46. The output of the voltage sensing means 14 is connected to a second input of the first summing amplifier 46 through an inverter (not shown) whereby the signal input to the second input of the first summing amplifier 46 is representative of the quantity $-V$. The output of the first summing amplifier 46, which is representative of the quantity $(IZ_R - V)$ is coupled to the input of a first level detector 48 through a filter 50. The filter 50 attenuates any transients which may be present on the signal $(IZ_R - V)$ prior to its input to the first level detector 48. The first level detector 48 provides an output signal only when the input signal exceeds a predetermined threshold value. As a result, the output of the first level detector 48 is representative of that portion of the signal $(IZ_R - V)$ which exceeds a predetermined threshold level. The output of the first level detector 48 is coupled to the input of a first squaring amplifier 52. The first squaring amplifier 52 processes the waveform into a format which is compatible with AND gate 54. The output of the first squaring amplifier 52, which as previously stated is representative of that portion of the $(IZ_R - V)$ signal which exceeds a predetermined threshold and is hereinafter referred to as the operating voltage $V_{OP}$, is coupled to one input of the the AND gate 54.

The relay 44 also includes a second summing amplifier 56. The output V, of the sequence network 20, which is proportioned to the positive sequence component of the line voltage, is coupled to one input of the second summing amplifier 56. The output of the transactor 18, which is representative of the quantity $IZ_R$, is coupled to the second input of the summing amplifier 56 through an inverting attenuating network (not shown) thereby causing the signal appearing at the second input of the second summing amplifier 56 to be representative of the quantity $-IZ'_R$. The degree of attenuation is a function of line length, with the preferred range of attenuation extending from approximately $0.5IZ_R$ for long lines to approximately $0.2IZ_R$ for short lines. The output of the second summing amplifier 56, which is representative of the quantity $(V_1 - IZ'_R)$ is coupled to the input of a memory filter 58. The memory filter 58 provides transient filtering and short term memory as previously described in connection with the memory filter 38 of the prior art relay 26. The output of the memory filter 58 is coupled to the input of a second level detector 60. The second level detector 60 provides and output only when the input signal supplied to the level detector exceeds a predetermined threshold level. Consequently, the output of the second level detector 60 is representative of that portion of the signal $(V_1 - IZ'_R)$ which exceeds the predetermined threshold level. The output of a level detector 60 is coupled to the input of a second squaring amplifier 62 which processes the signal into a format which is compatible with the AND gate 54. The output of the second squaring amplifier 52 is representative of that portion of the quantity $(V_1 - IZ'_R)$ which exceeds the predetermined threshold as previously described and is hereinafter referred to as the polarizing voltage $V_{POL}$. The output of the second squaring amplifier 62 is coupled to a second input of the AND gate 54. In the preferred embodiment of the relay of the present invention as depicted in FIG. 3, the AND gate 54 is a three input AND gate, the third input receiving a signal which is proportional to the quantity $IZ_R$. This third input performs a supervisory function which, in the case of a phase distance relay configuration, precludes operation of the protective relay when there is no current through its associated circuit breaker. The AND gate 54 provides an output when there is coincidence of $V_{OP}$, $V_{POL}$ and $IZ_R$. The output of the AND gate 54 is coupled to a characteristic timer 64 which measures the duration of phase coincidence of $V_{POL}$ and $V_{OP}$, during those times that the phase coincidence of those two quantities are also coincidence with the quantity $IZ_R$, and operates when phase coincidence occurs for a predetermined minimum time equal to the relay operate time. As previously stated, further information on AND circuitry and timer circuitry can be found in my copending U.S. Patent Application Ser. No. 879,653, the teachings of which have been incorporated herein.

Figure 4:
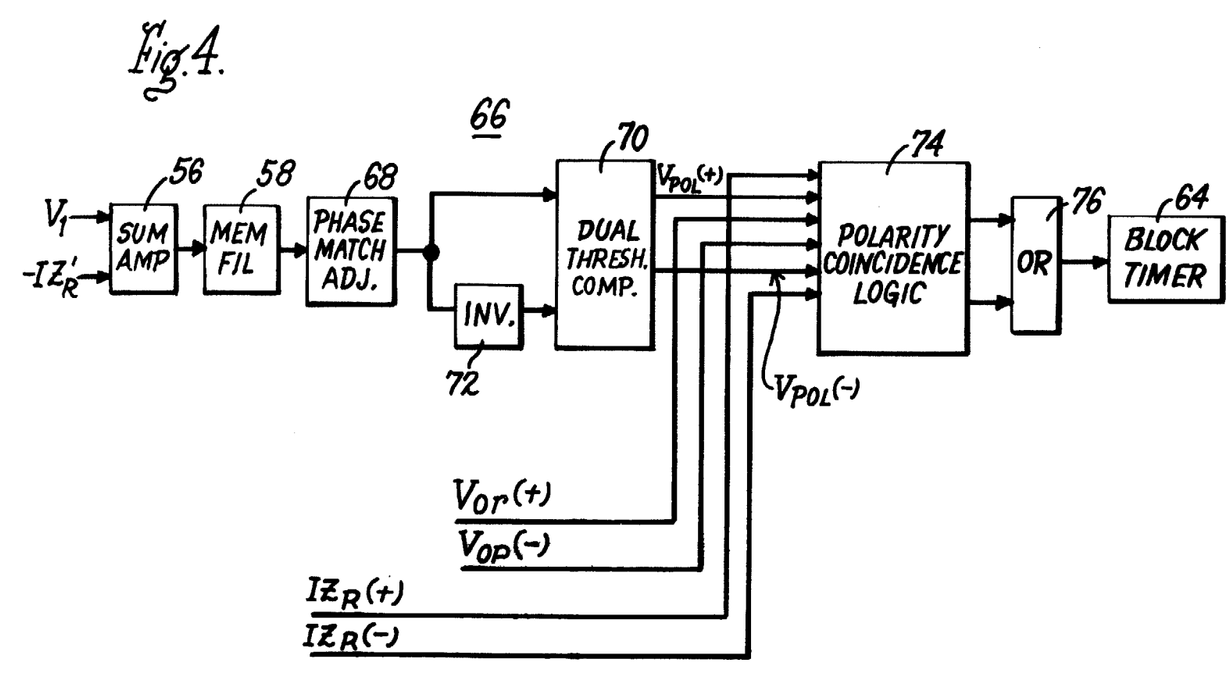
FIG. 4 is an expanded block diagram of the polarizing circuit portion of the protective relay depicted in FIG. 3.

Referring now to FIG. 4, there is shown an expanded block diagram of that portion of the FIG. 3 block diagram of the protective relay 44 enclosed by the dotted line and which represents the polarizing, coincidence and timing portions 66 of the ultra high speed relay of the present invention. As shown in FIG. 4, this portion 66 includes the second summing amplifier 56 and the memory filter 58. The output of the memory filter 58 is coupled to the input of a phase match adjust network 68. The phase match adjust network 68 will phase shift the signal representative of quantity $(V_1 - IZ'_R)$ so that the phase angle of the polarizing voltage $V_{POL}$ can be optimized on long line applications having heavy load transfer. The phase shift capability can be used to compensate for changes produced in the dynamic characteristic resulting from heavy load transfer as shown in FIGS. 11 and 12 in the paper entitled "Dynamic Characteristics of MHO Distance Relays," by S. B. Wilkinson and C. A. Mathews, Power Systems Management Business Department, General Electric Company, Philadelphia, Pa., presented to Pennsylvania Electric Association Relay Committee, Winter Meeting, Philadelphia, Pa., Feb. 22, 1979, the teachings of which are incorporated herein by reference.

The output of the phase match adjust network is coupled to a first input of a dual threshold comparator 70. The output of the phase match adjust network 68 is also coupled to a second input of the dual threshold comparator 70 through an inverter 72. The dual threshold comparator provides a pair of polarity related outputs when the associated polarity related inputs exceed a predetermined threshold level. In the preferred embodiment of the present invention, a dual threshold comparator is used in order to provide polarity related outputs which can then be compared with similar polarity related signals in a polarity coincidence logic network 74. A first output $V_{POL}(+)$ of a dual threshold comparator 70 is coupled to an input of the polarity coincidence logic network 74 for coincidence comparison with a positive segment $V_{OP}(+)$ of the operating signal and a positive segment $IZ_R(+)$ of the supervisory signal. A second output $V_{POL}(-)$ of the dual threshold comparator 70 is coupled to the polarity coincidence logic network 74 for coincidence comparison with a negative segment $V_{OP}(-)$ of the operating signal and a negative segment $IZ_R(-)$ of the supervisory signal. The polarity coincidence logic network 74 provides an output signal at a first output upon detection of coincidence between the positive segments of the polarizing signal $V_{POL}$, the operating signal $V_{OP}$ and the supervisory signal $IZ_R$; and provides an output signal at a second output upon detection of coincidence between the negative segments of the polarized signal $V_{POL}$, the operating signal $V_{OP}$ and the supervisory signal $IZ_R$. Both outputs from the polarity coincidence logic network 74 are coupled to an OR gate 76 which provides an output to the coincidence timer 64 whenever a signal appears at either one of the outputs from the polarity coincidence logic 74.

Figure 5:
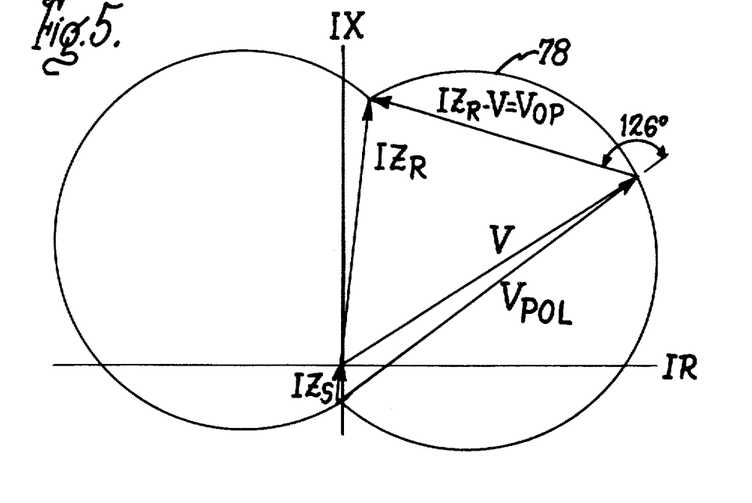
FIG. 5 depicts a dynamic characteristic associated with the prior art distance relay depicted in FIG. 2.

In the following description of the operation of the protective relay of the present invention, reference will be made to both the "Dynamic" and "Steady State" characteristics of protective relays. As is known in the art, the dynamic characteristics is the characteristic which exists immediately after the inception of the fault. Following fault inception, the dynamic characteristic begins to shrink toward the steady state characteristic. Further discussion of the dynamic and steady state characteristics can be found in the paper entitled "Dynamic Characteristics of MHO distance relays" which paper was previously referred to and is incorporated herein by reference. The dynamic characteristic for a prior art relay as depicted in FIG. 2, is shown in FIG. 5. This characteristic passes through $Z_R$, the forward reach setting and $Z_S$ the source impedance. The forward offset setting does not have a significant effect on the dynamic characteristic. The characteristic timer setting of 2.5 ms, causes the relay to produce an output when the angle between $V_{OP}$ and $V_{POL}$ is less than 126°, that is, when the impedance seen by the relay falls within the characteristic shown. Note that the coincidence period of 2.5 ms which is 54° at 60 hz, is equivalent to a separation angle of $180° - 54°$ or 126°.

Figure 6:
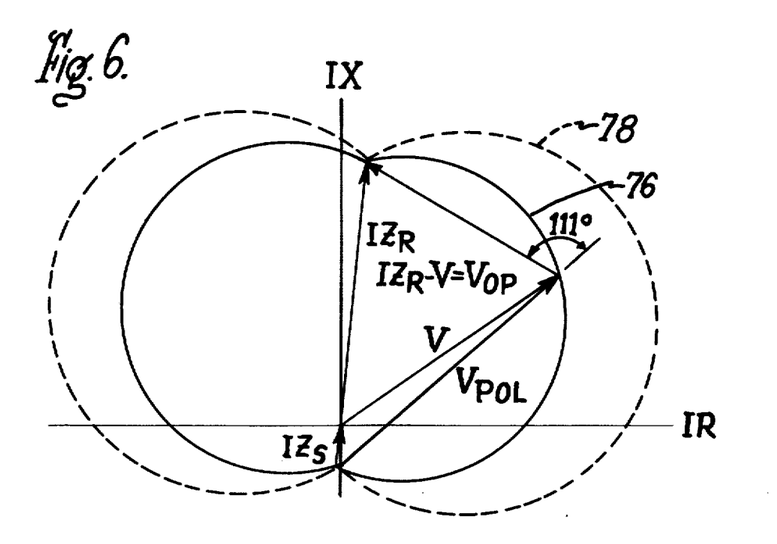
FIG. 6 depicts the effect of a polarizing circuit level detector on the dynamic characteristic depicted in FIG. 5.

The effect of a level detector 60 in the polarizing circuit of the protective relay in accordance with the present invention, is to reduce the size of the dynamic characteristic, as shown in FIG. 6. For a typical level detector setting of 25% of rated voltage, the polarizing voltage is not effective for approximately 15° on either side of a voltage zero. Therefore, the angle between $V_{OP}$ and $V_{POL}$ when viewed from the relay input terminals, must be reduced by 15° to produce an output. The combined effect of the 2.5 ms characteristic timer setting and the polarizing circuit level detector setting on the dynamic characteristic is the solid curve 76 of FIG. 6. The dotted curve 78 of FIG. 6 shows the dynamic characteristic for a relay without a level detector in the polarizing circuit.

Figure 7:
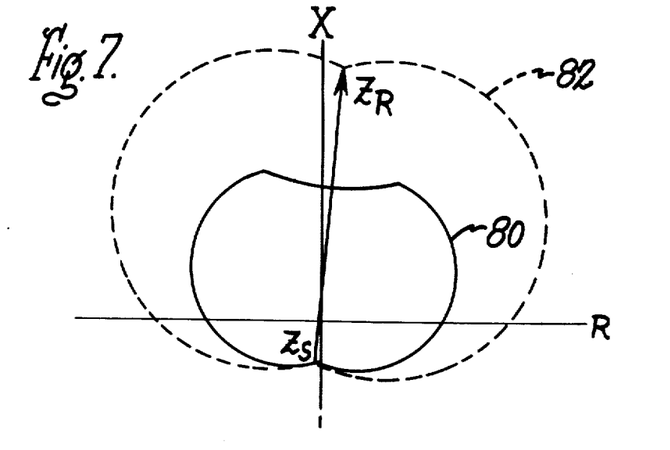
FIG. 7 depicts a comparison of the dynamic characteristic of the relay of FIG. 3 in comparison with the dynamic characteristic depicted in FIG. 6.

The inclusion of the level detector 48 in the operating circuit of the protective relay of the present invention further reduces the dynamic characteristic for a typical combination of settings and a typical system condition, as shown in FIG. 7. For a fault at the reach setting, $Z_R$, $IZ_R = V$ and $V_{OP} = 0$. The requirement that $V_{OP}$ be greater than the operating circuit level detector setting produces the sensitivity depression in the upper part of the solid characteristic curve 80. The remainder of the solid-line characteristic curve 80 also is reduced relative to the dotted characteristic curve 82, which is representative of the characteristic of a relay having a level detector in the polarizing circuit only, because of the effect of the operating circuit level detector 48 on the required angle between the operating signal $V_{OP}$ and the polarizing signal $V_{POL}$. This characteristic, and those shown in FIGS. 5 and 6, are representative of the no load condition. If load flow is present before the fault, the dynamic characteristic will shift, causing the required angle between the operating signal, $V_{OP}$, and the polarizing signal, $V_{POL}$, to be smaller on one side of the $Z_R$ impedance phasor and larger on the other, as described in the paper entitled "Dynamic Characteristics of MHO Distance Relays" previously referenced.

For the relay characteristics described above, the recommended settings are different than they would be for a conventional MHO relay. Since the tripping zone is determined by the combined effect of the reach setting, $Z_R$, and the operating circuit level detector, a number of different combinations culd be used to obtain a desired actual reach setting. The preferred embodiment encompasses the following choices, keeping in mind the fact that the actual tripping zone is considerably less than the reach setting, as shown in FIG. 7. For a first zone relay, it is necessary to choose a reach setting, $Z_R$ greater than the line length in order to have the tripping zone cover a large percentage of the line. A typical setting of $Z_R$ is 150% to 200% of the line, with a level detector setting that is higher than the calculated value of the operating signal, $V_{OP}$, for a fault near the end of the line for the condition of maximum fault current (minimum source impedance). If capacitor voltage transformers (CVT's) are used, the setting would be further increased to cover errors due to CVT transients. Also, to prevent operation on potential failure, the level detector is set higher than the product of the reach setting and the load current. The forward offset setting is typically 75% to 100% of the protected line length. The relay reach and forward offset settings for a second zone relay are similar to those for the first zone relay, but the level detector is set to be lower, with margin, then the calculated operating signal, $V_{OP}$ value for the minimum fault current condition for any interphase fault at the far end of the line. A typical margin is a setting of two-thirds of this calculated minimum operating signal value. The polarizing voltage level detector is preferable pre-set to 25% of rated voltage. This means that an input voltage that is 25% of rated voltage or more is required to permit the phase angle comparator to operate.

Figure 8:
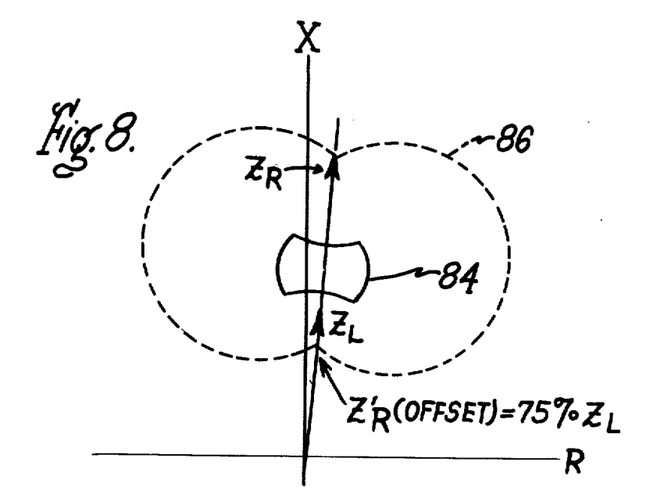
FIG. 8 depicts a typical steady state characteristic for a zone 2 relay in accordance with the present invention.

The steady state characteristic is determined by the combination of the reach setting, the offset setting and the level detector settings. For typical first zone settings, the combination of the forward offset and the operating circuit level detector setting eliminates the steady-state characteristic completely. For typical second zone settings, the steady state characteristic is approximately as shown by the solid curve 84 in FIG. 8. In this figure, the dotted line 86 shows the steady state characteristic that would exists if the first 48 and second 60 level detectors were not in the protective relay circuit, in order to illustrate how the level detectors reduce the size of the steady state characteristic.

It should be noted that ground distance relays, in accordance with the present invention, are substantially the same as phase distance relays. The principal difference being that ground distance relays employ single phase quantities as inputs thereto, as is well known in the art. For example the voltage input is the phase to ground voltage and the current input is the phase current compensated by $KI_o$ where K is determined by the difference between the zero sequence impedance of the transmission line and the positive and negative sequence impedances of the transmission line, and $I_o$ is the zero sequence component of the transmission line current.

Figure 9:
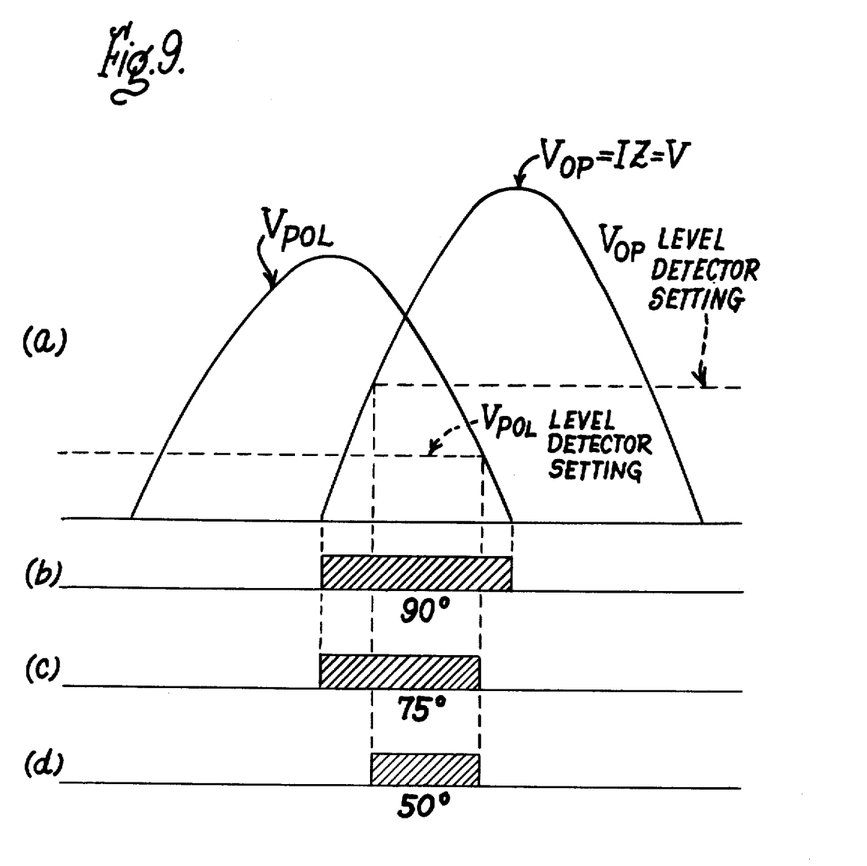
FIG. 9 shows the phase relationship between the polarizing voltage wave form and an operating voltage wave form and illustrates the effect on the coincidence therebetween resulting from varying the threshold level settings of the level detectors of the protective relay of the present invention.

As can be determined from the preceding description, the use of level detectors in the polarizing circuit as well as the operating circuit produces significant changes in the performance of protective relays. A traditional problem with distance relays is the compromise between operate time and the need to prevent operation on heavy load flow or load swings. For example, on long lines, 120° characteristic timer settings are often used to preclude operation on load swings that could enter the standard circular characteristic using a 90° timer setting. The 120° characteristic timer setting establishes a minimum operating time of 120° or 5.5 ms for all fault incidence angles. FIG. 9(a) illustrates a case where the polarizing and operating voltages are 90° apart that is, the threshold of operation of a circular characteristic.

Assuming that the operate and polarizing signals are a result of a load swing for which operation is not desired, a relay without level detectors in the signal circuit would require a timer setting greater than 90° to prevent operation (see FIG. 9(b)). Using a level detector in the polarizing circuit, as previously described, the input timer block is reduced by the time between the point at which the polarizing signal drops below the level detector setting and the point at which it crosses zero. For the case illustrated in FIG. 9(a), the $V_{POL}$ level detector setting provides a 15° reduction in the timer input block, allowing a 15° reduction in the characteristic timer setting. The shorter timer setting permits a faster minimum operating time.

Similarly, using a level detector in the operating circuit also, the input timer block is further reduced by the time between the point at which the operating signal crosses zero and the point at which it reaches the level detector setting. For the case illustrated in FIG. 9(d), the $V_{OP}$ level detector setting provides an additional 25° reduction in the timer input block, allowing an additional 25° reduction in the characteristic timer setting. This still shorter timer setting permits an even faster minimum operating time. Note that the minimum operating time occurs for fault incidence angles when the voltage wave is rising and closer to a voltage peak than to a voltage zero, which are considered the more probable fault incidence angles.

Figure 10:
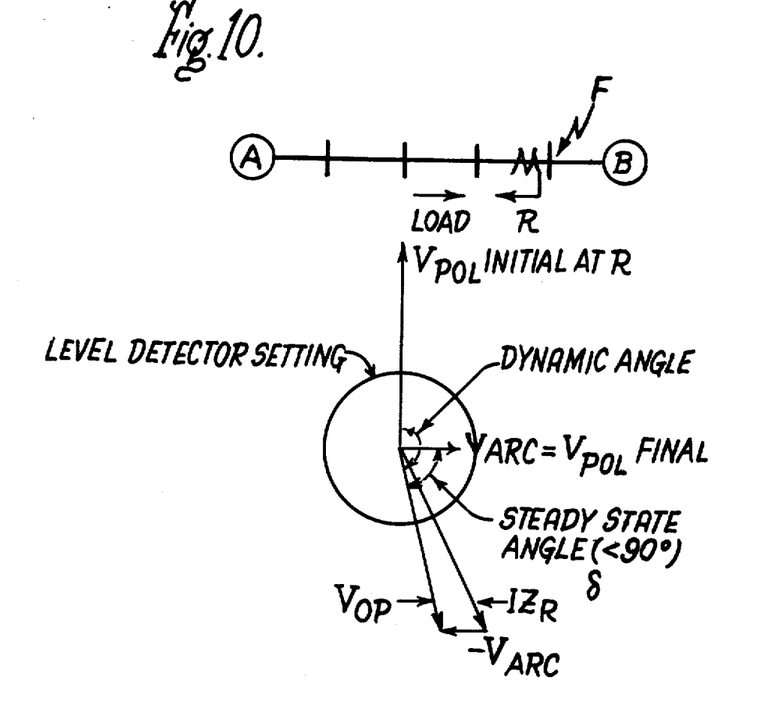
FIG. 10 is a phasor diagram depicting the operation of one form of the distance relay of the present invention located at position R on a transmission line.

Another advantage of the level detector in the polarizing circuit is present especially when a forward offset is not used, as is illustrated in FIG. 10. FIG. 10 is constructed for a relay at the receiving end of a long transmission line or system, (See the paper entitled Dynamic Characteristics of MHO Distance Relays which was previously cited). The relay is set to trip for faults in the line, but FIG. 10 illustrates a case for a fault very close to the relay on the bus behind it, where the relay voltage is essentially the voltage drop in the fault arc. Because of the load flow over the line, the operate signal leads the initial polarizing voltage by substantially more than 180°, causing the angle between the operate signal and the steady state polarizing signal to be much less than 90°. This appears to be a normal distance relay with a 90° characteristic timer setting as an operating condition. However, the arc voltage is approximately 5% of the normal polarizing voltage. If the level detector in the polarizing voltage circuit is set significantly larger than the arc voltage, then undesired operation for a fault behind the relay will be eliminated. The level detector in the polarizing circuit also eliminates steady state operation for faults near the relay location. As the level detector threshold is increased, the product of the fault current and the impedance to the fault must also increase to produce a voltage large enough to allow the relay to operate. Although the relay will operate for these fault locations near the relay on a dynamic basis, it renders the relay unsuitable for backup protection where the relay must operate steady state in order to control a zone 2 or zone 3 timer.

Note that the level detector in the polarizing circuit may be advantageous or disadvantageous when considering out of step conditions where the locus of the impedance seen by the relay intersects the line impedance at a location for which the level detector setting precludes operation. This will advantageous if operation of the line relays is undesirable for the case where the line should not be tripped for the out of step condition. On the other hand, if it is desired that the line should be tripped for this out of step condition, the relay response is disadvantageous since other means of out of step detection must be provided.

In some distance relay designs, a forward offset is employed to minimize the probability of operation under load conditions. In a particular ultra high speed design, a forward offset is employed, both to minimize the angular separation of the operate and polarizing signals, and to preclude operation of the distance relay when the impedance "seen" by the relay due to an out of step condition passes through the line impedance. For this application, the offset impedance must be equal to the line impedance. If it is less, the relay will operate for power swings passing through the line impedance near the end of the line; if it is larger there is a danger that the polarizing voltage will reverse during a fault on the remote bus, and cause a false operation when the fault is cleared and the operate voltage returns to its phase position, that is, approximately in phase with the remembered reverse polarizing voltage. The use of a level detector in the polarizing circuit eliminates the possibility of undesired operation for faults, or power swings passing through the line impedance, near the end of the line. If the offset impedance overreaches the line impedance by a small amount, the polarizing voltage may reverse, but its magnitude will be less than the level detector setting, thus preventing operation of the relay when the fault is cleared. If the offset impedance is a little less than the line impedance, a power swing impedance passing through the end of the line will not produce sufficient polarizing voltage to rise above the level detector setting to permit operation. This preceding discussion assumes a significant setting on the level detector in the polarizing circuit, for example, 25% of rated voltage.

While the present invention has been described with reference to a specific embodiment thereof, it will be obvious to those skilled in the art that various changes and modifications may be made without departing from the invention in its broader aspects. It is contemplated in the appended claims to cover all variations and modifications of the invention which come within the true spirit and scope of my invention.

What is claimed as new and desired to be secured by Letters Patent of the United States is:

1. In a protective relay for one or more transmission lines in a three-phase ac power system, the relay being of a phase comparator type and including phase coincidence detecting means responsive to at least two input signals supplied thereto, one input signal being an operating signal and a second input signal being a polarizing signal, and timer circuit means responsive to an output signal from said phase coincidence detecting means when the phase coincidence of the input signals is of a predetermined duration, an improvement wherein:
   a. said operating signal comprises that portion of a first difference signal which exceeds a predetermined threshold value, the first difference signal being related to the difference between (1) the product of a signal proportional to transmission line current and a replica impedance of the transmission line and (2) a signal proportional to transmission line voltage; and
   b. said polarizing signal comprises that portion of a second difference signal which exceeds a predetermined threshold value, the second difference signal being related to the difference between (1) a signal proportional to a voltage representative of the transmission line voltage and (2) the product of the signal proportional to transmission line current and the replica impedance of the transmission line multiplied by a predetermined constant.

2. A protective relay in accordance with claim 1 wherein:
   a. said first difference signal is related to the difference between (1) the product of the signal proportional to transmission line current and a replica impedance of the transmission line and (2) a signal proportional to transmission line voltage during fault; and
   b. said second difference signal is related to the difference between (1) a signal proportional to the positive sequence component of the pre-fault transmission line voltage and (2) the product of the signal proportional to transmission line current and the replica impedance of the transmission line multiplied by a predetermined constant.

3. Protective relay in accordance with claim 2 wherein the magnitude of said predetermined constant is a function of the reach of said relay.

4. Protective relay in accordance with claim 3 wherein the magnitude of said predetermined constant lies within a range of 0.2 to 0.5 inclusive.

5. A protective relay in accordance with claim 3 wherein transmission line voltage during a fault is the voltage between two faulted phases of said three phase power system, and the transmission line current is the difference of the phase currents of the faulted phases.

6. A protective relay in accordance with claim 3 wherein the transmission line voltage during a fault is the voltage between the faulted phase of said three phase power system and ground potential, and the transmission line current is the current in the faulted phase plus a portion of the zero sequence current that provides compensation for the difference between the positive and negative sequence impedances, and the zero sequence impedance of the transmission line.

7. A protective relay in accordance with claim 1 in which said phase coincidence detecting means is responsive to three input signals thereto, the third signal being related to the product of the signal proportional to transmission line current and the replica impedance of the transmission line.

8. A protective relay circuit for generating a signal for controlling the trip coil of a circuit breaker protecting an ac power transmission line comprising:
   a. difference circuit means for producing a first difference signal proportional to the difference between (1) a signal proportional to transmission line current multiplied by a pre-selected constant reference impedance and (2) a signal proportional to transmission line voltage;
   b. first alternating current level detection means responsive to said first difference signal for producing an output signal when said first difference signal exceeds a predetermined threshold value;
   c. difference circuit means for producing a second difference signal proportional to the difference between (1) a signal proportional to a voltage representative of the transmission line voltage and (2) a signal proportional to the product of the signal proportional to transmission line current and the pre-selected constant reference impedance multiplied by a pre-determined constant;
   d. filter means responsive to said second difference signal for filtering transients from said second difference signal and for providing memory of the prior steady state second difference signal;
   e. second alternating current level detection means responsive to said filtered second difference signal for producing an output signal when said filtered signal exceeds a predetermined threshold value;
   f. coincidence detection means for producing a coincidence signal output in response to detecting coincidence at least between the output signal of said first alternating current level detecting means and the output signal of said second alternating current level detection means; and g. coincidence responsive means for receiving said coincidence signal output and being operative, when enabled, to effect operation of said trip coil in response to a coincidence signal output of a predetermined minimum time duration;

said protective relay circuit permitting production of an effective coincidence signal output only if said first difference signal and said filtered second difference signal both exceed respective predetermined threshold values.

9. A protective relay circuit in accordance with claim 8 wherein:
   (a) said first difference signal is proportional to the difference between (1) the product of the signal proportional to transmission line current and a replica impedance of the transmission line and (2) a signal proportional to transmission line voltage during a fault; and
   (b) said second difference signal is proportional to the difference between (1) a signal proportional to the positive sequence component of the pre-fault transmission line voltage and (2) the product of the signal proportional to transmission line current and the replica impedance of the transmission line multiplied by a predetermined constant.

10. The protective relay circuit in accordance with claim 9 wherein the magnitude of said predetermined constant is a function of the reach of said protective relay circuit.

11. A protective relay circuit in accordance with claim 10 wherein the magnitude of said predetermined constant lies within a range of 0.2 to 0.5 inclusive.

12. A protective relay circuit in accordance with claim 8 wherein said coincidence responsive means include characteristic timer means, said characteristic timer means producing a signal output for use in controlling the trip coil in a circuit breaker in response to said predetermined minimum time duration coincidence signal output of said coincidence detector means.

13. A protective relay circuit in accordance with claim 12 wherein said characteristic timer means maintains a signal output for a predetermined period of time once a signal output is generated.

14. A protective relay circuit in accordance with claim 8 wherein said coincidence detection means produces a coincident signal output in response to detecting coincidence between the output signal of said first alternating current level detecting means, the output signal of said second alternating current level detection means and a third signal proportional to the product of the signal proportional to transmission line current and the pre-selected constant reference impedance.

15. A protective relay circuit in accordance with claim 14 wherein said coincidence detection means comprises a three input AND gate.

16. A protective relay circuit for generating a signal for controlling the trip coil of a circuit breaker for protecting one or more transmission lines in a three phase ac power system, said circuit comprising:

a. difference circuit means for producing a first difference signal proportional to the difference between (1) a signal proportional to transmission line current multiplied by a replica impedance of the transmission line and (2) a signal proportional to transmission line voltage during fault;

b. first alternating current level detection means responsive to said first difference signal for producing an output signal when said first difference signal exceeds a predetermined threshold value;

c. difference circuit means for producing a second difference signal proportional to the difference between (1) a signal proportional to a positive sequence component of the pre-fault transmission line voltage and (2) the product of a signal proportional to transmission line current and the replica impedance of the transmission line multiplied by a predetermined constant;

d. filter means responsive to said second difference signal for filtering transients from said second difference signal and for providing memory of the prior steady state second difference signal;

e. second alternating current level detection means responsive to said filtered second difference signal for producing an output signal when said filtered signal exceeds a predetermined threshold value;

f. coincidence detection means for producing a coincidence signal output in response to detecting coincidence at least between the output signal of said first alternating current level detecting means and the output signal of said second alternating current level detection means; and g. coincidence responsive means for receiving said coincidence signal output and being operative, when enabled, to effect operation of the trip coil in response to a coincidence signal output of a predetermined minimum time duration, said protective relay circuit permitting production of an effective coincidence signal output only if said first difference signal and said filtered second difference signal both exceed respective predetermined threshold values.

17. The protective relay circuit in accordance with claim 16 wherein the transmission line voltage during a fault is the voltage between two faulted phases of said three phase power system, and the transmission line current is the difference of the phase currents of the faulted phases.

18. The protective relay circuit in accordance with claim 16 wherein the transmission line voltage during a fault is the voltage between the faulted phase of said three phase power system and ground potential, and the transmission line current is the current in the faulted phase plus a portion of the zero sequence current that provides compensation for the difference between the positive and negative sequence impedances, and the zero sequence impedance of the transmission line.

* * * * *